Oct. 9, 1923.  
R. E. OGDEN  
BOLT ANCHOR  
Filed Aug. 9, 1921  
1,469,950
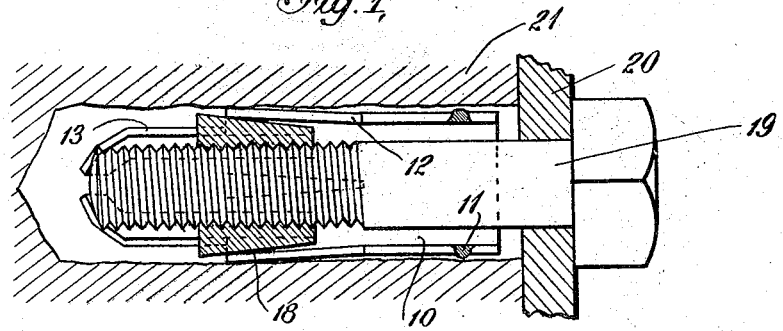
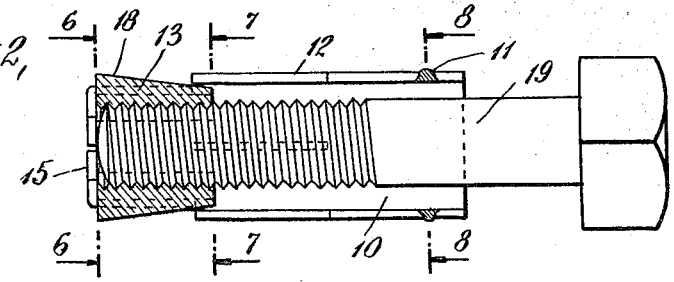
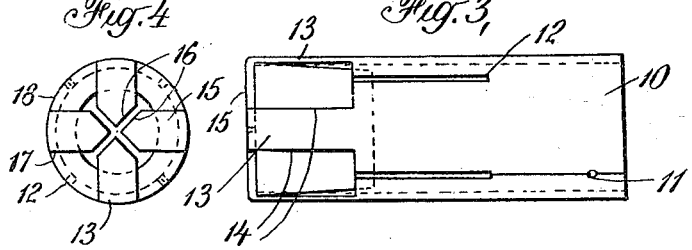 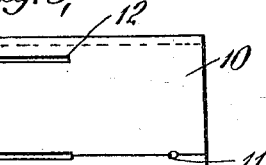 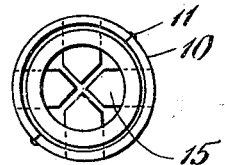
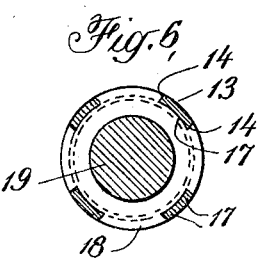 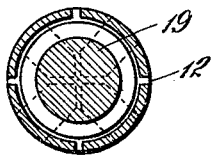 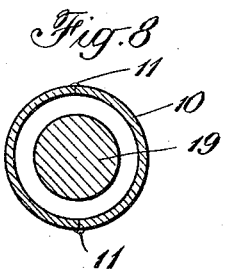
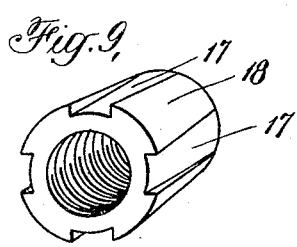
Inventor  
Ralph E. Ogden  
By Attorney  
E. W. Marshall Patented Oct. 9, 1923.

1,469,950

UNITED STATES PATENT OFFICE.

RALPH E. OGDEN, OF MOUNTAINVILLE, NEW YORK, ASSIGNOR TO THE ORSBEE COMPANY, INC., A CORPORATION.

BOLT ANCHOR.

Application filed August 9, 1921. Serial No. 490,859.

*To all whom it may concern:*

Be it known that I, RALPH E. OGDEN, a citizen of the United States, and a resident of Mountainville, Orange County, and State of New York, have invented certain new and useful Improvements in Bolt Anchors, of which the following is a specification.

This invention relates to bolt anchors and more particularly to anchors of the character employed in walls of brick, stone or cementitious material, not adapted to directly receive a threaded bolt.

One of the objects of this invention is to provide an expansion shield that may be economically manufactured.

Another object of the invention is to provide an expansion shield and a nut for expanding the shield, having interengaging parts whereby the nut will be guided in its movement by the shield.

Further objects will appear as the description proceeds.

The above objects are attained in the embodiment of the invention illustrated by an expansion shield formed from sheet metal stampings secured together preferably adjacent one end by spot welding. The shield has a plurality of fingers at one end, each finger having its edges substantially parallel, and the fingers being spaced equal distances from the axis of the shield and substantially is alinement with the main portion of the shield. The ends of the fingers are bent inwardly toward the axis of the shield. The nut for expanding the shield has grooves with parallel edges, the grooves receiving the fingers whereby the nut will be guided in its movement. Intermediate the groove the nut has tapered or wedge shaped surfaces adapted to engage the expansible portions of the shield as the nut is moved longitudinally on the bolt.

Referring to the drawings,

Fig. 1 is a sectional elevation of a portion of a wall having an opening therein and having a bolt anchor constructed in accordance with the invention expanded in the opening.

Fig. 2 is a sectional elevation of the bolt anchor with the shield shown before expansion.

Fig. 3 is an elevation of the expansion shield.

Fig. 4 is an elevation of the inner end of the shield shown in Fig. 3.

Fig. 5 is an elevation of the opposite end of the shield shown in Fig. 3.

Figs. 6, 7 and 8 are sectional elevations taken substantially on lines 6—6, 7—7 and 8—8 of Fig. 2 and Fig. 9 is a perspective view of the nut used in connection with the expansion shield.

The expansion shield is preferably made up of a plurality of sections 10 formed from sheet metal stampings and these sections are joined together adjacent one end by spot welding as shown at 11. The sections of the shield are longitudinally slotted as shown at 12 and adjacent their ends are provided with longitudinally extending fingers or tines 13. The fingers 13 have parallel edges 14 and at their free ends are turned inwardly as shown at 15 toward the axis of the shield, the extreme ends being tapered as shown at 16.

The nut for expanding the shield is provided, as shown particularly in Fig. 9, with a plurality of longitudinal grooves 17, the walls or sides of these grooves being parallel to each other. The grooves are suitably spaced around the nut to receive the fingers 13 and the surfaces of the grooves are disposed equi-distantly from the axis of the nut or in a common cylinder. Intermediate the grooves 17 the nut has formed thereon inclined or tapered portions 18 having their outer surfaces preferably disposed in a common cone. The portions 18 form wedges for expanding the shield as hereinafter described. The nut is provided with a longitudinal screw-threaded bore for receiving a bolt 19 by means of which an object 20 may be secured to the wall 21 of the building structure.

The bolt anchor above described operates as follows; assuming that the bolt 19 has been passed through a suitable opening in the object 20 the end of the bolt is threaded into the nut as shown in Fig. 2 and the anchor is then inserted in the opening in the wall 21. Upon the initial rotation of the bolt 19, the end of the bolt will abut against the ends 15 of the fingers 13 thereby feeding the nut longitudinally on the bolt. As the nut is fed on the bolt the wedge shaped portions 18 of the nut will engage the portions of the shield between the slots 12 thereby expanding the shield as shown in Fig. 1 into contact with the wall of the structure 21.

As the nut moves along the bolt it is guided by the fingers 13 which are disposed in the grooves 17.

The engagement of the fingers or tines 13 with the sides of grooves in the nut also serves to hold the sections of the shield together, so that they will not come apart until expanded even if they are not spot-welded together as shown. Moreover, this engagement holds the sections together near one end of the shield and the spot-welding holds them together near the other end of the shield. But both of these arrangements for holding the sections together are too weak to interfere with the operation of expansion.

Although one specific embodiment of the invention has been illustrated and described, it will be understood that the invention is capable of modification and that changes in the construction and in the arrangement of the various cooperating parts may be made without departing from the spirit or scope of the invention as expressed in the following claims.

What I claim is:

1. In combination, an expansion shield having a plurality of longitudinally extending fingers with their edges substantially parallel and a nut for expanding said shield having grooves with parallel walls for receiving said fingers.

2. In combination, an expansion shield having a plurality of longitudinally extending fingers with their edges substantially parallel and a nut for expanding said shield having grooves with parallel walls for receiving said fingers, the portions of the nut intermediate the grooves being tapered for expanding the shield.

3. In combination, an expansion shield having a plurality of longitudinally extending fingers with their edges substantially parallel and a nut for expanding said shield having grooves with parallel walls for receiving said fingers, the grooved portions of the nut lying in a cylinder and the intermediate portions lying in a cone.

4. In combination, an expansion shield slotted longitudinally and having fingers forming the inner end portion of the shield, and a nut having grooves for receiving said fingers and having portions for expanding said shield.

5. In combination, an expansion shield slotted longitudinally and having fingers forming the inner end portion of the shield, said fingers being inturned at their ends, and a nut having grooves for receiving said fingers and having portions for expanding said shield.

6. An expansion shield having longitudinal slots extending toward the outer end of the shield from the inner end thereof and having fingers extending longitudinally from the portions of the shield between the slots therein.

7. An expansion shield having longitudinal slots extending toward the outer end of the shield from the inner end thereof and having fingers extending longitudinally from the portions of the shield between the slots therein and inturned at their ends.

8. A nut for expanding a shield, said nut being frusto-conical in shape and having longitudinal grooves therein with their walls substantially parallel.

9. In combination, a sectional expansion shield having longitudinally extending fingers adjacent one end of the shield and bent inwardly at their ends, a nut having cut away portions receiving said fingers therein and means connecting the shield sections adjacent their opposite ends.

In witness whereof, I have hereunto set my hand this 5th day of July, 1921.

RALPH E. OGDEN.

Witness:
I. B. MOORE.